May 26, 1970  R. S. HERBST  3,514,212
INCIPIENT STALL SENSOR

Filed June 11, 1968  2 Sheets-Sheet 2

INVENTOR.
ROBERT S. HERBST
BY Harry A. Herbert Jr.
ATTORNEY

Richard J. Killoren
AGENT

United States Patent Office 3,514,212
Patented May 26, 1970

3,514,212
INCIPIENT STALL SENSOR
Robert S. Herbst, Marblehead, Mass., assignor to the United States of America as represented by the Secretary of the Air Force
Filed June 11, 1968, Ser. No. 736,215
Int. Cl. F04d 27/00
U.S. Cl. 415—23                    1 Claim

ABSTRACT OF THE DISCLOSURE

A freely movable sensing vane is located between two compressor stator vanes to determine the aerodynamic angle of attack of the air stream flowing over the stator vanes to provide a signal to an indicator to show an incipient stall condition.

Background of the invention

Various means have been used to prevent stall in the compressors of gas turbine engines such as by establishing predetermined schedules with sufficient margin such that stall is prevented under all conditions of engine operation or such as by the use of sonic sensors. Some of these systems prevent the making use of maximum engine efficiency or are vulnerable to engine degradation or will not protect against unusual transient conditions.

Summary of the invention

According to this invention a sensing vane free to rotate on its longitudinal axis is located between two compressor stator vanes in the compressor of a gas turbine engine. As the angle of attack of the air flowing over the stator vanes varies, the sensing vane will correspondingly rotate about its axis so that all forces and couples remain balanced. The rotation of the sensing vane is transmitted by a spindle to a transducer which converts the signal to any desired form, such as a hydraulic, electrical or mechanical signal which may be applied to an indicator which the pilot may use to indicate corrective action to be taken or to provide a signal which may be used to regulate the engine control system as to prevent stall.

Description of the preferred embodiment

Figure 1:
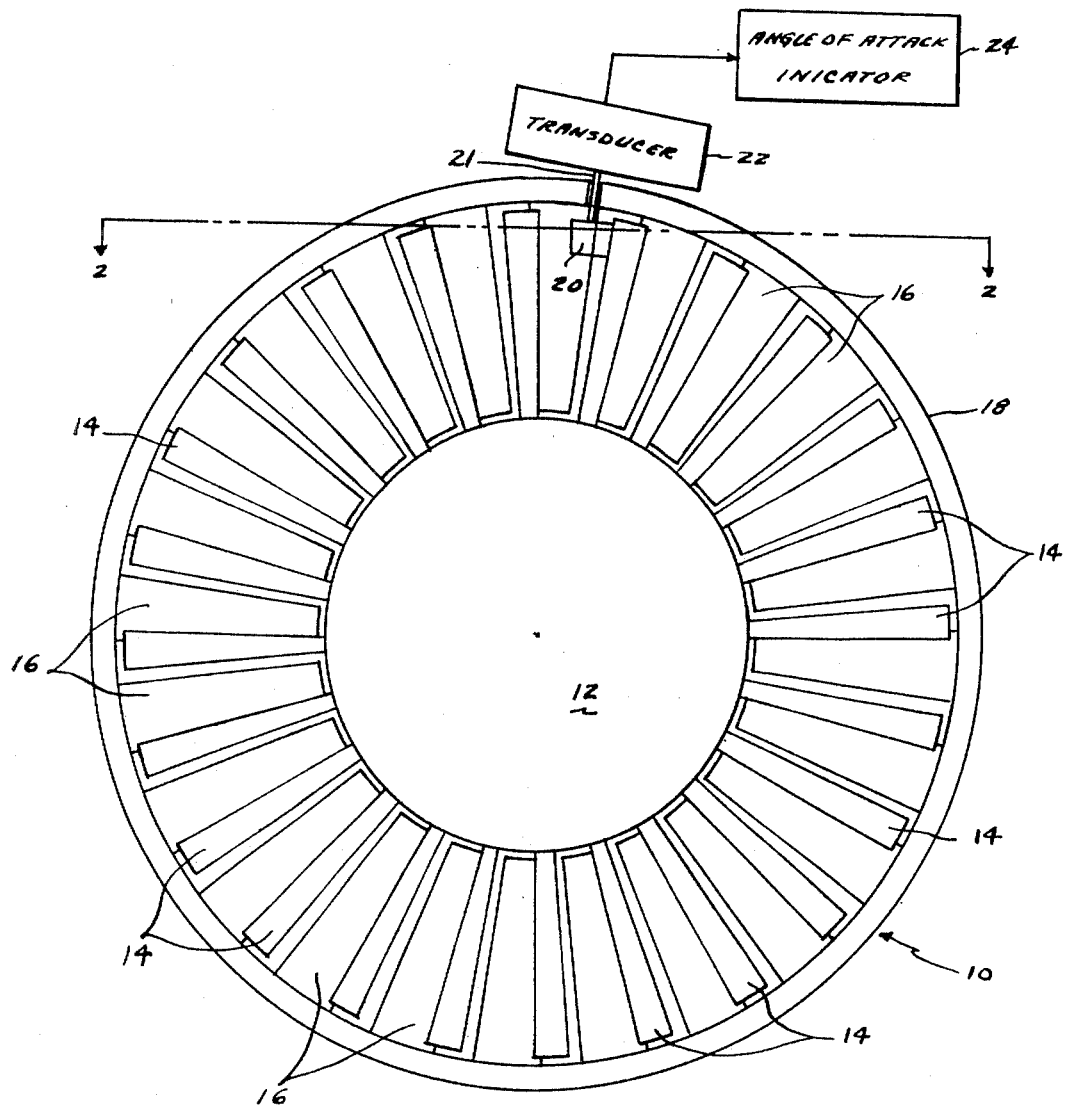
FIG. 1 is an end schematic view of a gas turbine compressor including the sensing vane of the invention.
Figure 2:
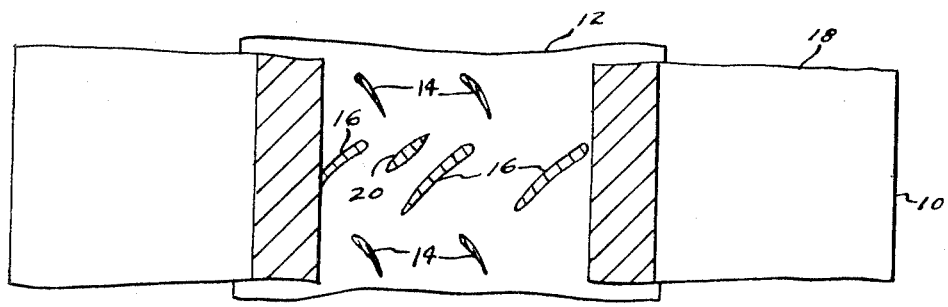
FIG. 2 is a partially cutaway sectional view of the device of FIG. 1 along the line 2—2.

Reference is now made to FIG. 1 of the drawing wherein 10 is a conventional gas compressor having a rotor shaft 12 supporting a plurality of rotor blades 14. A plurality of stator vanes 16 are secured to an outer wall member 18. A stall sensing vane 20 is secured to a rotatable shaft or spindle 21 which extends through the wall member 18 and is connected to a transducer 22. The stall sensing vane 20 is positioned between two stator vanes 16 as shown in FIG. 2.

The output of transducer 22 is applied to a utilization device such as an indicator 24 or to apparatus to regulate the engine control system to automatically reschedule fuel supply when an incipient stall regime is approached. The transducer 22 may provide mechanical movement or may provide a hydraulic or electrical output signal. For example, the transducer may be a conventional variable transformer wherein the coupling between the energized primary and the secondary windings is determined by their relative position.

In the operation of the device of the invention the vane 20 is positioned between two of the stator vanes 16. As the aerodynamic angle attack of the air flowing over the stator vanes varies, the sensing vane 20 will rotate about its axis, so that all forces and couples remain balanced. The rotation of the vane is transmitted by shaft 21 to the transducer 22. The transducer 22 converts the signal into the proper usable form depending upon the particular use. For example, the shaft 21 could position an energized winding of a transformer with respect to the secondary winding to vary the coupling and thus provide an electrical output signal that can be supplied to an AC meter or indicator 24 which is calibrated to indicate the angle of attack.

Figure 3:
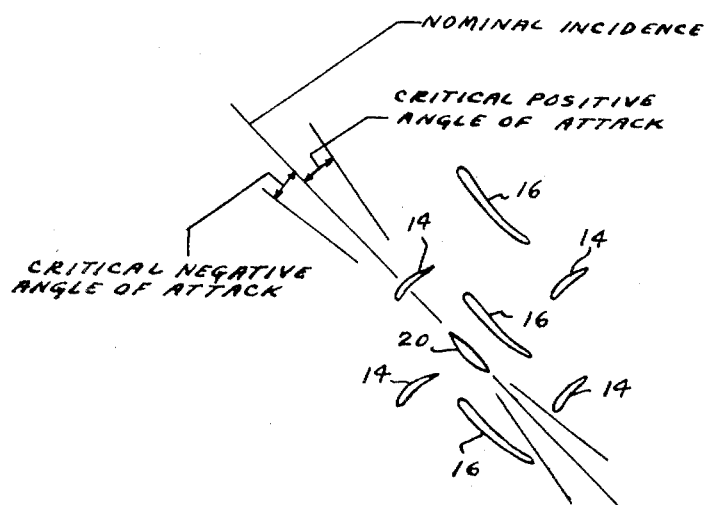
FIG. 3 is a schematic view of the vanes for the device of FIG. 1 indicating the critical positive and negative angle of attack.

The critical positive and negative angles of attack, shown in FIG. 3, denote limits beyond which lie regions of impending compressor stall. Corresponding sensing vane attitudes can be determined for these two limiting angles. The indicator can then be calibrated with markings indicating these positions. The electrical signal could also be used for fuel schedule modulation to prevent stall from occurring. The time rate of change of the output signal could also be used to modulate fuel schedule cutback in a manner to enable fuel schedules closer to the absolute stall limit.

On multistage compressors it may sometimes be necessary to provide more than one stall sensor.

There is thus provided a device for indicating an incipient stall condition in the compressor of a gas turbine engine.

While a certain specific embodiment has been described, it is obvious that numerous changes may be made without departing from the general principles and scope of the invention.

I claim:

1. In combination with an air compressor for a gas turbine engine having a cylindrical housing; a stator including a plurality of radially positioned stator vanes secured to the housing; a rotor within said housing; said rotor having a rotor shaft and a plurality of radially positioned rotor blades secured to said shaft with the rotor blades being positioned adjacent the stator vanes; a device for determining the angle of attack of the gas entering the stator comprising a freely movable sensing vane positioned between at least two of said stator vanes for sensing the angle of attack of the gas entering the stator; means connected to the freely movable sensing vane by means of a rotatable shaft passing through the wall of said cylindrical housing, for converting the angle of attack information to an angle of attack signal and means for utilizing the angle of attack signal, whereby the engine control system may be regulated to prevent a stall condition in the compressor.

References Cited

UNITED STATES PATENTS

| 2,390,043 | 12/1945 | Borden | 230—115 |
| 2,677,273 | 5/1954 | Johnson | 230—114 X |
| 2,810,512 | 10/1957 | Lippisch | 230—114 |
| 3,327,933 | 6/1967 | Baumann et al. | 230—114 |
| 3,403,842 | 10/1968 | Roche | 230—114 |

WILLIAM L. FREEH, Primary Examiner